US006901061B1

(12) United States Patent
Joo et al.

(10) Patent No.: US 6,901,061 B1
(45) Date of Patent: May 31, 2005

(54) HANDOFF CONTROL IN AN ENTERPRISE DIVISION MULTIPLE ACCESS WIRELESS SYSTEM

(75) Inventors: Ki Hyun Joo, San Jose, CA (US); Peter S. Rha, Santa Clara, CA (US); Chol Su Kang, Fremont, CA (US); Sang Kyoon Hyun, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 749 days.

(21) Appl. No.: 09/655,102

(22) Filed: Sep. 5, 2000

(51) Int. Cl.[7] .............................................. H04B 7/216

(52) U.S. Cl. ...................... 370/335; 370/331; 370/442; 370/338

(58) Field of Search ................................ 370/338, 328, 370/329, 331, 332, 333, 335, 342, 441; 455/422.1, 436, 437, 438, 439, 440, 441, 442, 443, 444

(56) References Cited

U.S. PATENT DOCUMENTS 5,123,029 A 6/1992 Bantz et al.
5,280,472 A * 1/1994 Gilhousen et al. .......... 370/335
5,828,661 A * 10/1998 Weaver et al. .............. 370/331
5,848,063 A * 12/1998 Weaver et al. .............. 370/331
5,870,665 A 2/1999 Uchikawa
5,903,834 A 5/1999 Wallstedt et al.
5,917,811 A * 6/1999 Weaver et al. .............. 370/332
5,926,470 A * 7/1999 Tiedemann, Jr. ............ 370/334
5,930,726 A 7/1999 Fujita
6,112,088 A * 8/2000 Haartsen ..................... 455/437
6,366,561 B1 * 4/2002 Bender ....................... 370/238
6,377,805 B1 4/2002 Anvekar et al.
6,496,493 B1 * 12/2002 Chung ........................ 370/332
6,631,263 B1 * 10/2003 Corkery ...................... 455/436
6,654,362 B1 * 11/2003 Palamara .................... 370/332
6,654,609 B2 11/2003 Kim
6,711,408 B1 * 3/2004 Raith ......................... 455/440
6,714,785 B1 * 3/2004 Han ........................... 455/440

* cited by examiner

*Primary Examiner*—Bob A. Phunkulh
(74) *Attorney, Agent, or Firm*—Baker Botts L.L.P.

(57) ABSTRACT

A wireless office communication system including a wireless internet base station (WIBS) encompassing a base station controller, a mobile switch controller and an ethernet interface module for coupling the WIBS to an existing internet protocol (IP) based network. A wireless office communication system can also be based on the conventional architecture comprising the BTS, BSC and MSC. The WIBS or BTS is attached to a number of antennas via different and identifiable delay elements for the purpose of determining the serving antennas of mobile communication units. A location determination logic enables the system to handle handoffs between a WIBS or BTS and the external public communication system in an optimum manner. Handling handoff requests in this manner prevents unnecessary ping-ponging of handoff and can also increase the percentage of successful handoff by frequency monitoring of the quality of the mobile communication units located in the handoff transition area, particularly to the public communication system.

7 Claims, 4 Drawing Sheets

$f_1$
MACRO CELL SITE
MACRO-SYSTEM COVERAGE
$f_2$
ENTERPRISE SYSTEM COVERAGE
HARD HANDOFF AREA BETWEEN TWO SYSTEMS
LOBBY DOOR $A_5$
MACRO CELL SITE
MACRO-SYSTEM COVERAGE
$A_6$
$A_4$
$\tau_5$
$\tau_6$
$\tau_4$
MACRO-SYSTEM COVERAGE
$A_3$
$A_1$
$A_2$
OVERLAP AREA FOR HARD HO
$\tau_3$
LOBBY DOOR
$\tau_1$
$\tau_2$

HANDOFF CONTROL IN AN ENTERPRISE DIVISION MULTIPLE ACCESS WIRELESS SYSTEM

CROSS-REFERENCE TO RELATED APPLICATION

This is related to Joo et al., co-filed U.S. patent application Ser. No. 09/655,107, entitled "METHOD OF HANDOFF CONTROL IN AN ENTERPRISE CODE DIVISION MULTIPLE ACCESS WIRELESS SYSTEM." To the extent not repeated herein, the contents of Joo et al. are incorporated by reference.

FIELD OF THE INVENTION

The present claimed invention relates generally to the field of wireless communication systems. More particularly, the present claimed invention relates to handoff control between code division multiple access communication systems within an in-door enterprise system and with the public system.

BACKGROUND ART

Communication systems that utilize coded communication signals are well known in the art. One such system is a code division multiple access (CDMA) cellular communication system such as set forth in the Telecommunications Industry Association/Electronic Industries Association International Standard (TIA/EIA IS-95), hereinafter referred to as IS-95. In accordance with the IS-95, the coded communication signals used in CDMA systems comprise CDMA signals that are transmitted in a common 1.25 MHz bandwidth to base stations of the system from mobile or wireless communication units, such as cell phones or portable wireless computers or wireless handheld devices, that are communicating in a specific coverage area of the base station. In conventional CDMA systems, a Base Station Transceiver Subsystem (BTS) communicates with a Base Station Controller (BSC) which allows the communication unit to communicate with other communication units within the same coverage area. Each CDMA signal includes a pseudonoise (PN) sequence associated with a particular base station and an identification number of a communicating communication unit.

Typically, the BSC is connected to a mobile switching controller (MSC) which allows a BTS to connect with other BTSs outside its coverage area in order to allow a communicating communication unit to communicate with other units outside its coverage area.

FIG. 1 illustrates a conventional CDMA communication system 100 including a first base station 110, a second base station 120, and one or more communication units 105, 106. The communication system 100 illustrated in FIG. 1 is an exemplary CDMA system which includes a direct sequence CDMA cellular communication system, such as that set forth in TIA/EIA IS-95.

In the system shown in FIG. 1, the base stations 110 and 120 are connected to a base station controller 130 and a mobile switching controller 140 which is in turn connected to the Public Switched Telephone Network (PSTN) 150 using known techniques.

The system shown in FIG. 1 further connects to the public land mobile network (PLMN) and Public Switched Telephone Network (PSTN) to allow mobile communication units travel from one network (roaming) to another while maintaining a subscriber profile information. A detailed illustration of the PLMN is shown in FIG. 1B. In the system shown in FIG. 1B, a conventional cellular (Personal Communications Service (PCS)) wireless communication network is shown. In the network shown in FIG. 1B, a network subscriber's profile information is typically stored and maintained in a Home Location Register (HLR) and a Visitor Location Register (VLR).

Still referring to FIG. 1, when a communication unit initiates a call sequence to either one of the base stations 110 and 120 within a coverage area, an end-to-end connection is established between the respective base station and the base station controller 130 and the MSC 140 using known CDMA call setup techniques. The base stations 110 and 120 typically communicate with the BSC 130 and the MSC 140 via communication links, such as a T1 connection. Base stations 110 and 120 typically have antennas to define the coverage area within which that base station accommodates the communication units.

In the system shown in FIG. 1, when a communicating communication unit initiates a call sequence (uplink) to the nearest base station, the call is assigned to the target communication unit via the BSC 130 and the MSC 140 within a prescribed bandwidth (e.g. 1.25 MHz for IS-95).

Also, in the conventional CDMA system shown in FIG. 1, communication between a communicating communication unit and the base station requires a dedicated end-to-end connection between the base station, the base station controller and the mobile switching controller. Such dedicated end-to-end connection can also be very expensive and time consuming.

In the exemplary CDMA system shown in FIG. 1, each base station transmits a pilot signal having a common PN spreading code that is offset in code phase from the pilot signal of other base stations within the system. During system operation, the mobile communication unit is provided a list of code phase offsets corresponding to neighboring base stations surrounding the base station through which communication is established. The mobile unit is equipped with a searching function which allows the mobile unit to track the signal strength of the pilot signal from a group of base stations including the neighboring base stations.

Various methods exist for switching the mobile communication unit from one base station to another (typically known as "handoff"). One such method is termed a "soft" handoff, in which communication between the mobile unit and the end user is uninterrupted by the eventual handoff from an original base station to a subsequent base station. This method is considered a soft handoff in that communication with the subsequent base station is established before terminating communication with the original base station. When the mobile unit is communicating with two base stations, a single signal for the end user is created from the signals from each base station by a communication system controller.

Mobile unit assisted soft handoff operates based on the pilot signal strength of several sets of base stations as measured by the communication unit. An Active Set is the set of base stations through which active communication is established. A Neighbor Set is a set of base stations surrounding an active base station comprising base stations that have a high probability of having a pilot signal strength of sufficient level to establish communication.

When communications are initially established, the communication unit communicates through a first base station, and the unit monitors the pilot signal strength of the base station in the Active Set and the Neighbor Set. When a pilot signal of a base station in the Neighbor Set exceeds a predetermined threshold level, the base station is added to the Candidate Set and removed from the Neighbor Set at the communication unit.

The communication unit communicates a message identifying the new base station. The base station controller decides whether to establish communication between a new base station and the communication unit. Should the base station controller decide to do so, the base station controller sends a message to the new base station with identifying information about the communication unit and a command to establish communications.

When the communication unit is communicating with multiple base stations, it continues to monitor the signal strength of base stations to determine which base station to connect to in the event of a signal strength degradation.

Each base station has a coverage area that has two handoff boundaries. A handoff boundary is defined as the physical location between two base stations where the link would perform the same regardless of whether the mobile unit were communicating with the first or second base station. Each base station has a forward link handoff boundary and a reverse link handoff boundary.

The forward link handoff boundary is defined as the location where the mobile unit's receiver would perform the same regardless of which base station it was receiving. The reverse link handoff boundary is defined as the location of the mobile unit where two base station receivers would perform the same with respect to that mobile unit. Ideally, these boundaries should be balanced, meaning that they have the same physical location with respect to the base station. If they are not balanced, system capacity may be reduced as the power control process is disturbed or the handoff region unreasonably expands.

In any of these conventional systems, the soft handoff between base stations still requires the active base station to maintain contact with the base station controller as it hands off communication to a neighboring base station or a candidate base station. Upon handing over communication, the new base station (now active base station) resumes communication with the mobile unit via the base station controller. The conventional system described in FIG. 1 or FIG. 2 does not allow each base station to communicate with the other during a handoff since all communications have to go through the base station controller. This takes time and in a data traffic transmission can be costly.

With the introduction of enterprise in-building wireless communication services, the problem of handoff is even more complicated within the enterprise system. FIG. 3 is a prior art illustration of an enterprise communication system. In the system of FIG. 3, the enterprise system may be comprised of multiple BTS which may be located at the lower floor of a multi-floor building or campus.

The enterprise system of FIG. 3 needs to co-exist with the wide-area public system in terms of frequency reuse and interference control and to provide seamless services via handoff. However, in the system of FIG. 3, a common problem occurs when a mobile user enters a location that is near a border between two cell sites within the enterprise system. In this situation the signal level of the mobile unit tends to fluctuate at both cell sites. This signal level fluctuation results in a ping-ponging situation in which repeated requests are made to handle calls back and forth between the two cell sites. Furthermore, the ping-ponging situation raises the possibility that the call will be discontinued if it is unnecessarily transferred to a cell in which all channels are in use and thus unavailable for accepting the handoff.

In the system illustrated in FIG. 3, a user located in a higher floor in a multi-floor building may experience unnecessary ping-ponging handoffs as a result of the mobile unit trying to communicate with the BTS internal to the enterprise system and the external cell sites which may be transmitting stronger signals than the internal BTS serving the mobile unit. This is because the signal strength of the wide-area public system is stronger, especially at locations "Loc A" and "Loc B" than the signal strength from the BTS located on the ground floor of the building.

Such unnecessary ping-ponging of handoffs increases the likelihood of the mobile unit incorrectly hearing handoff commands or failure in hearing commands. Furthermore, the ping-ponging situation raises the possibility that a call will be discontinued. This can be very costly and time consuming for a mobile user communicating with any other mobile user within the enterprise system. Unnecessary ping-ponging handoffs also make it costly for the enterprise system accounting to reconcile calls within the enterprise system and those made to external cell sites.

Therefore, it is desirable to have a robust method for handing-off CDMA calls including voice and data over a communication pathway within an enterprise wireless communication system. It is further desirable to have a CDMA call handling method that handles the transmission of calls, especially data calls, without the inherent costly call ping-ponging effect of the prior art. A need further exists for an improved and less costly system which improves efficiency and the transmission rate and time of calls between a mobile unit and a base station, and between base stations and a base station controller, and between adjacent base stations within an enterprise wireless communication system.

SUMMARY OF THE INVENTION

The present invention is directed to a system and a method for providing an enterprise in-building or campus-wide IP based code division multiple access (CDMA) wireless system. The present invention is capable of handling both voice and data transmission within the CDMA system without the inherent delays and signal quality degradation encountered during call handoffs by conventional CDMA systems. The present invention further provides a system which controls handoffs between an enterprise CDMA communication system and macro systems external to the enterprise system by keeping users on the enterprise premise to the enterprise system. This therefore provides a less costly and more timely way of handling handoffs between the enterprise system and external macro systems without unnecessary ping-ponging between the two systems.

In the enterprise CDMA system of the present invention, a handoff technique is implemented which permits a mobile unit within the enterprise system to initiate a handoff. The mobile unit is permitted to determine the best new cell-site to which communications are to be transferred to and from an old cell-site. The invention further permits a cell base station to identify the location of the mobile unit requesting a handoff in order to determine the most efficient way to handle the handoff requests.

The invention further includes an integrated wireless internet base station (WIBS) which is connected to the internet and an existing networking infrastructure within an office building or campus. The wireless base station utilizes known ethernet transmission protocols to transmit data over an ethernet back-bone to various wireless communication devices within a building. The wireless base station further includes a call processing module which is capable of determining whether a call originating from or received by the base station to and from a communication unit is either a voice or a data call. The WIBS also integrates the base station control functions of the prior art to reduce call setups between a communication unit and the WIBS, and call handoffs between multiple WIBSs.

The invention further includes location based handoff control logic for handling communication diversity signal handoff between various communications units and base stations within the enterprise system. The location based handoff control logic determines a particular base station within the enterprise system serving a particular user, and hands-off the user based on the signal delays inserted in the communication path between the user and the base station.

In one embodiment of the present invention, the handoff control logic hands-off a mobile user to macro cell-sites external to the enterprise system from a predetermined designated location within the enterprise system in order to avoid signal degradation and the cost of reconciling when mobile units within the enterprise system are communicating with the external cell-sites.

The designated transition locations within the enterprise system are covered by extended antenna units which are directly or remotely connected to base stations located within the enterprise system. In a multi-floor enterprise system configuration, the extended antenna units may be distributed on various floors of a multi-floor building in order to provide the requisite coverage for the mobile units within the enterprise system.

The invention further includes communication signal delay elements which are inserted into the signal paths between the mobile units and the base stations in order to ensure that the enterprise base stations can only handoff communications with mobile units to the external macro cell-site within the designated transition areas.

The invention further includes handoff implementation logic which allows handoffs within the enterprise system only to mobile units in the designated handoff transition areas.

The present invention further provides an implementation advantage over the prior art by allowing inter-network communication between the wireless office communication system of the present invention and other mobile networks on the Public Land Mobile Network (PLMN). The inter-networking communication of the present invention is implemented over an ANSI-41D using the ethernet transport protocol of UDP/IP or TCP/IP transport protocol via an ethernet interface to the ethernet back-bone of the system. The use of the ethernet interface is less costly than the prior art and further allows easy and flexible connectivity to existing in-office, building or campus networks.

These and other objects and advantages of the present invention will no doubt become obvious to those of ordinary skill in the art after having read the following detailed description of the preferred embodiments which are illustrated in the various drawings.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

Prior Art

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The invention is directed to a system, an architecture, a subsystem and method to manage mobile communication handoff requests in an enterprise wireless communication system in a way superior to the prior art. In accordance with an aspect of the invention, a base station allows CDMA call coverage within a building without requiring a dedicated and a lengthy end-to-end transmission.

In the following detailed description of the present invention, a system for a wireless internet protocol based communication system is described. Numerous specific details are now set forth in order to provide a thorough understanding of the present invention. However, it will be recognized by one skilled in the art that the present invention may be practiced without these specific details or with equivalents thereof.

Generally, an aspect of the invention encompasses providing an integrated wireless enterprise system which may be an in-building or campus-wide CDMA communication system which provides a wide range of voice, data, video and other services in conjunction with a private branch exchange interfaced to the Public Switched Telephone Network (PSTN) and the internet. The invention is generally adaptable to conventional CDMA communication systems and generally applies to frequency-to-frequency hard handoffs. The invention can be more fully described with reference to FIGS. 4 through 7.

FIGS. 4 through 7 illustrate systems and methods for determining user location within an enterprise wireless communication system in accordance with the preferred embodiments of the present invention. The location based handoff system illustrated in FIGS. 4 through 7 are each preferably implemented as part of a cellular telephone system that uses the CDMA techniques for communicating within a cellular telephone system.

Figure 1:
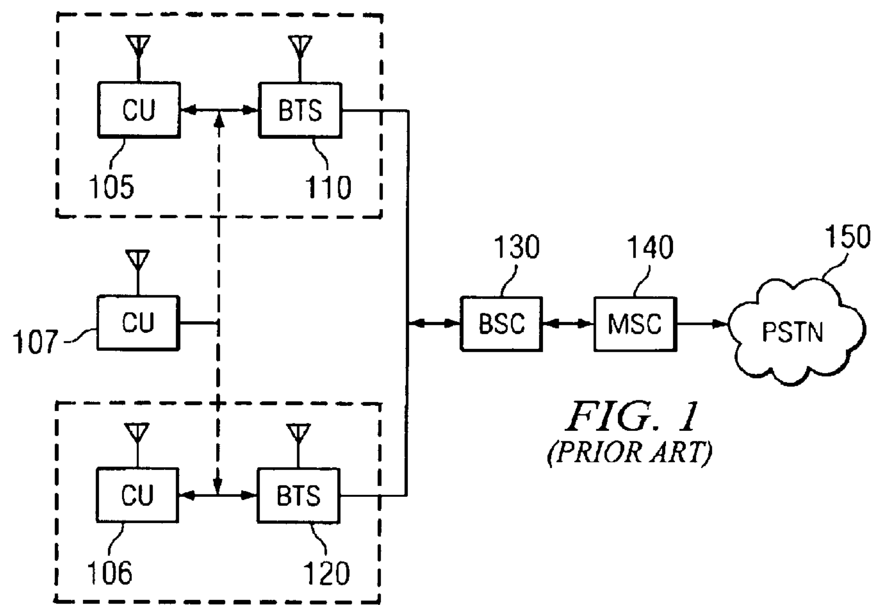
FIG. 1 is a block diagram of a conventional CDMA system.
Figure 1B:
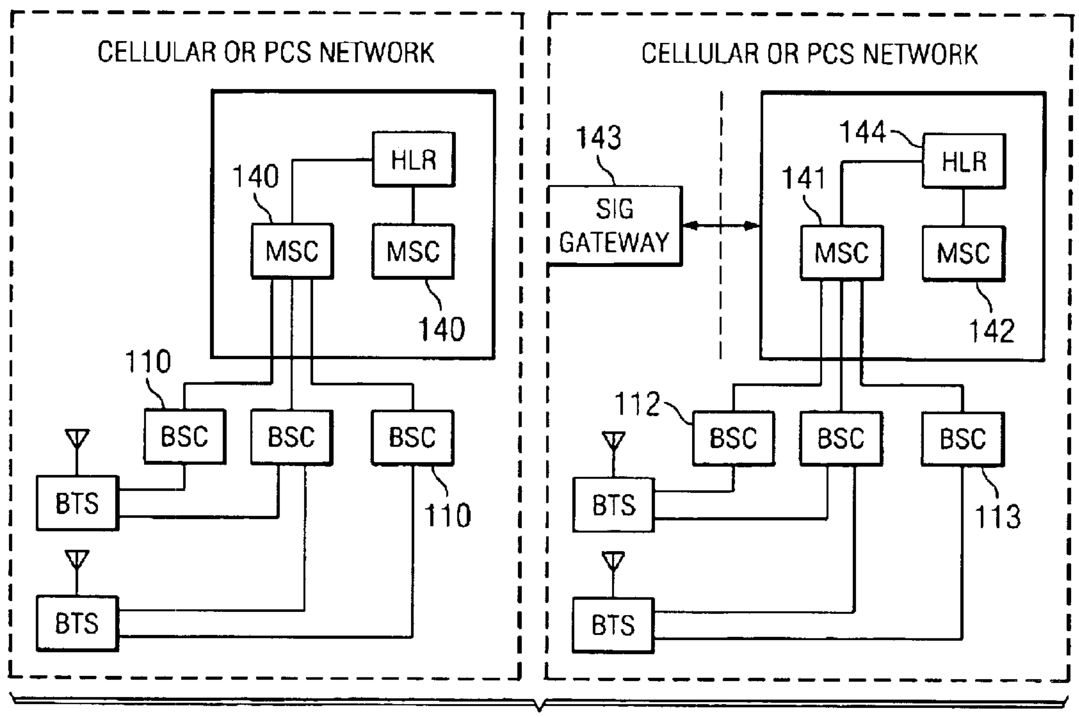
FIG. 1B is a block diagram of an implementation of the Public Land Mobile Network (PLMN)
Figure 2:
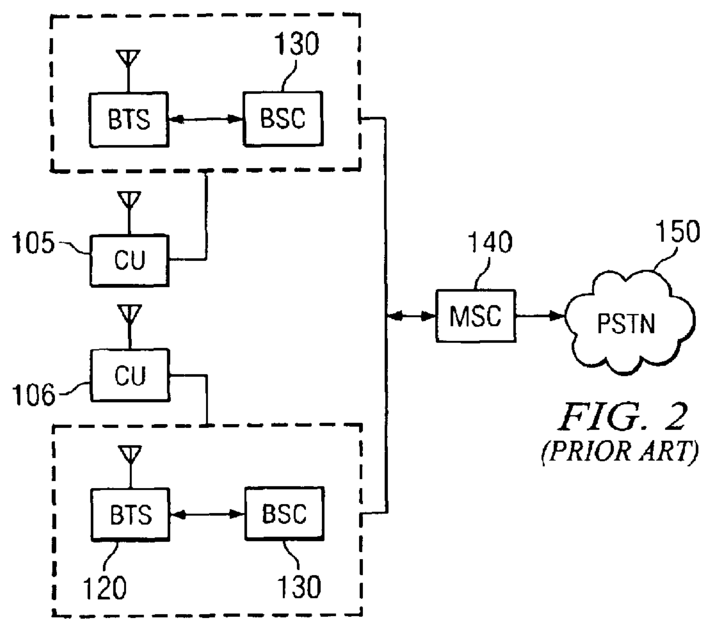
FIG. 2 is a block diagram of a conventional multiple carrier CDMA system.
Figure 3:
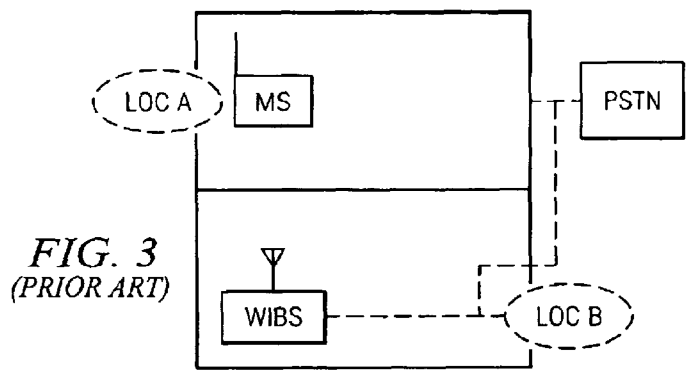
FIG. 3 is a block diagram of a prior art in-building enterprise communication system showing how signal handoffs are handled.
Figure 4:
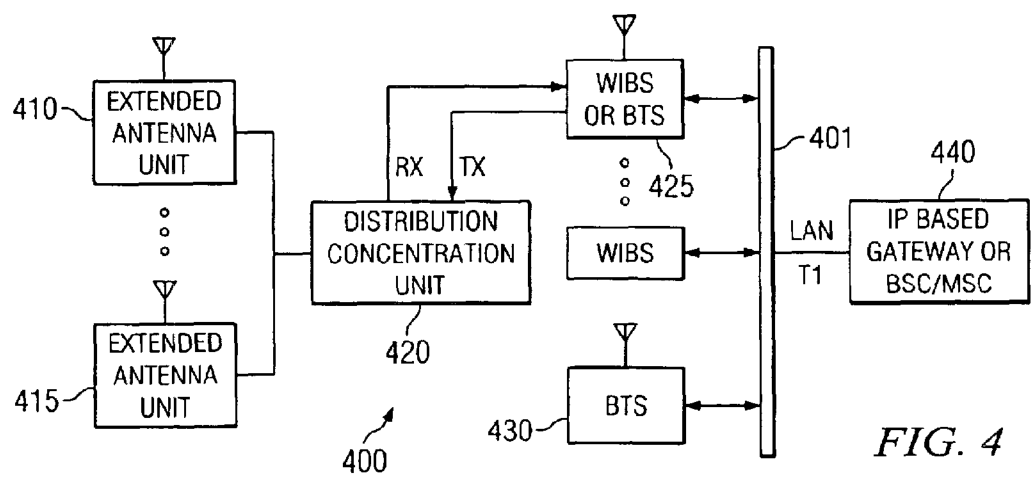
FIG. 4 is a block diagram of an embodiment of the in-building enterprise wireless communication system of the present invention including a distribution concentration unit, signal delay element unit, extended antenna units, and integrated wireless base stations of the present invention.

Referring now to FIG. 4, a functional illustration of the enterprise wireless communication system (EWCS) 400 of the present invention is shown. EWCS 400 comprises extended antenna units (EAUs) 410–415, signal distribution concentration unit (DCU) 420, wireless base stations (BTS) 425–430, communication pathway 401, internet protocol based gateway 440 and base station controller 450.

EAUs 410–415 are preferably adapted to receive incoming communication signals to mobile communication units within EWCS 400. EAUs 410–415 are passive or active with amplifying devices which permit continuous transmission and reception of data throughout the EWCS 400. EAUs 410–415 collect transmitted signals from mobile communication units within EWCS 400 and provides the signals to DCU 420. In one embodiment of the present invention, EAUs 410–415 include signal delay elements to resolve call multi-signals and to increase call diversity within the EWCS 400. The reception and transmission strength of the EAUs depend on the way the EAUs are deployed within the enterprise system and the in-building environmental conditions. For example, EAUs 410–415 may cover an area of about 10–20 meters within EWCS 400.

DCU 420 is coupled to EAUs 410–415 to receive and transmit signals from the EAUs to base stations 425 and 430. In one embodiment of the present invention, DCU 420 includes signal delay element unit 421 to enable DCU 420 delay signal transmissions to base stations 425 and 430. DCU 420 receives divided transmit signals from base stations 420–425, delays the divided transmit signal and transmits the signals to the EAUs. DCU 420 further includes control logic capable of generating control messages such as cell diversity mode requests and cell-site communication termination commands. The control processing logic is responsive to the data received from the EAUs and base stations in making decisions relative to handoffs and diversity combining. DCU 400 further receives multiple delayed transmit signals from the EAUs, combines the signals and transmits the combined signals to base stations 425–430.

Still referring to FIG. 4, BTSs 425–430 are coupled to receive and transmit call signals from and to DCU 420. BTSs 425–430 preferably is an IP based system which enables EWCS 400 to take advantage of existing networking infrastructure in an office building or a similar environment to communicate wireless calls from the mobile units to other wireless devices on the network, internet or to the PSTN. BTSs 425–430 includes switching functions to process traffic from various sources such as voice and data for delivery over the ethernet back-bone. Integration of base station controller and mobile switch controller functions enables BTSs 425–430 to manage and coordinate radio resources to effect operations such as call origination, terminations and handoffs.

BTSs 425–430 further provide interface between a CDMA PCS or a cellular mobile communication system and the BTSs 425–430 to enhance mobility within a wireless office environment covering hot spots, dead spots, or loads which traditional public cellular or PCS networks such as on-campus network could not address.

BTSs 425–430 are coupled to the ethernet back-bone 401 preferably through a 10/100 base-T interface and related software stack to handle data burst on the LAN that traditional CDMA systems could not handle. BTSs 425–430 receives and sends data to and from cellular regions within EWCS 400 to other subscribing mobile units in the EWCS 400.

The BTSs 425–430 have forward and reverse link boundaries similar to the prior art. The forward link is defined as the location where the mobile communication unit's receiver would perform the same regardless of which BTS it was receiving. The reverse link handoff boundary is defined as the location of the mobile communication unit where two BTS receivers would perform the same with respect to that mobile unit.

In the EWCS 400 of the present invention, a user location identification logic (not shown) is integrated into the base stations to identify mobile communications within the enterprise system. The identification logic further includes a handoff call request logic which allows the base station to optimize the control of mobile unit handoffs only within designated handoff transition regions within the enterprise system. Controlling handoff requests within the designated handoff region prevents unnecessary ping-ponging of handoffs between the mobile communication units and the external public system (e.g. PSTN).

Figure 5:
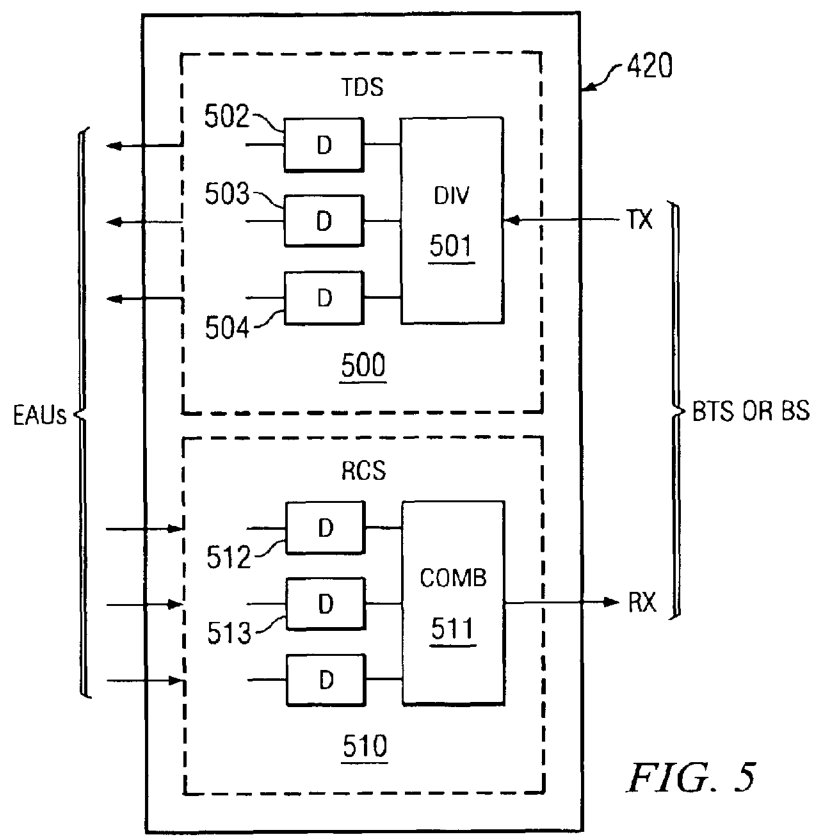
FIG. 5 is a block diagram of an embodiment of the distribution concentration unit including a transmit distribution subsystem and a receive concentration subsystem.

Referring now to FIG. 5, a functional block diagram illustrating one embodiment of the distribution concentration unit 420 is shown. As shown in FIG. 5, DCU 420 preferably comprises transmit distribution subsystem (TDS) 500, receive concentration subsystem (RCS) 510 and other signal control logic (not shown).

TDS 500 comprises a signal divider 501 coupled to a plurality of delay elements 502–504. In the present invention, TDS 500 receives a CDMA signal from base stations located within EWCS 400. The CDMA signal from the base stations is transmitted via multiple antennas distributed within the EWCS space for the purpose of each antenna covering part of an area to be covered by the base stations. The CDMA signal transmitted by the base stations are received by TDS 500, divided in divider 501 and distributed to the antenna via delay elements 502–504. Delay elements 502–504 have delay times large enough to be distinguishable by the base stations which are inserted in the CDMA signal transmit paths to the antennas.

RCS 510 is coupled to receive CDMA signals transmitted by the various antennas within the EWCS 400 for transmission to the base stations. RCS 510 includes a combiner 511 and a plurality of delay elements 512–514. Like the delay elements in TDS 500, the delay elements in RCS 510 have time delays large enough to be distinguishable by the base stations. CDMA signals from mobile communication units within EWCS 400 are received via multiple antennas distributed within EWCS 400 and combined in combiner 511. The combined signal is connected to the base station receiver. The base station can determine the antenna unit serving a given mobile communication unit, and thus its location, by detection of the delay time of the received signal. Although the embodiment shown in FIG. 5 has delay elements inserted in the path of the receive and transmit signal paths to and from the base station, the present invention can be implemented with delay elements inserted in the path of only either one of the receive (RX) and transmit (TX) signals.

The knowledge of the location of a mobile communication unit is used in optimizing the handoff performance between the EWCS 400 and the public systems, as well as within the enterprise system 400. For example, if the mobile communication unit is located in areas or on floors in a building where the user is not likely to transmit to the coverage area of the public system, then any handoff requests to the public system are denied. If the mobile communication unit is located in the desired handoff area with the public system, then the handoff parameters and thresholds can be adjusted to improve the probability of successful handoff to the public system.

Figure 6:
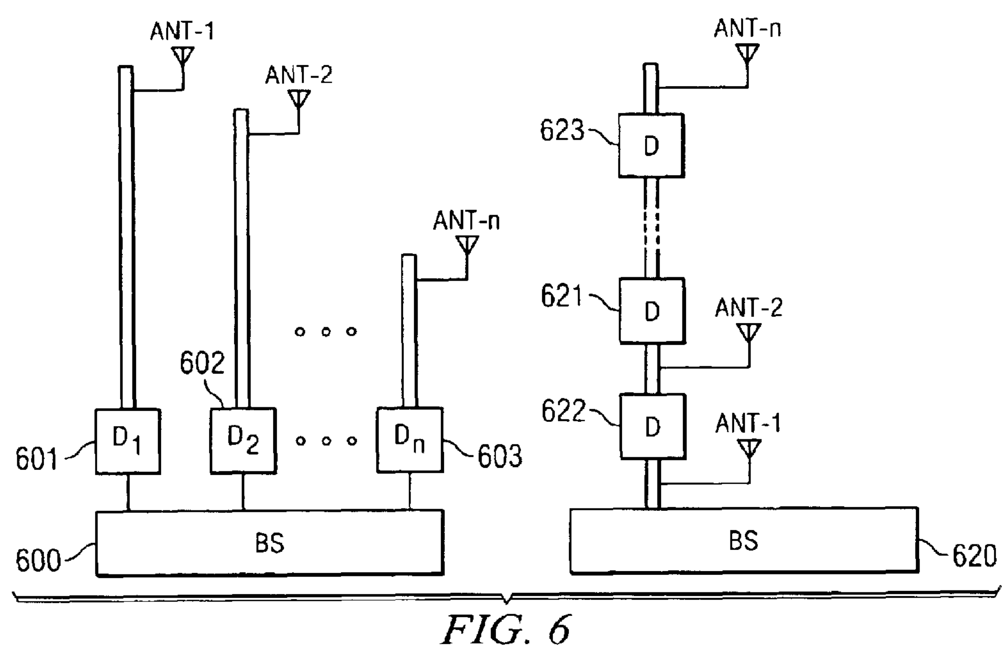
FIG. 6 is a block diagram illustrating alternative configurations for connecting multiple antennas to the WIBS or BTS of the present invention.

FIG. 6 is a block diagram illustration of embodiments of other configurations of multiple antennas connected to the WIBS or BTS of the present invention. In FIG. 6, configuration 600 illustrates a star chain configuration of the antenna system within EWCS 400. In the star chain configuration, each antenna is separately coupled to the base station via separate signal paths with varying time delay elements 601–603 inserted in each path. The star configuration of FIG. 6 offers a more reliable implementation of the enterprise system of the present invention since a break in the path of one antenna connection will not affect the other antennas in the system.

Another configuration of the system of the present invention is illustrated in configuration 620. In configuration 620, the antennas in the enterprise system are daisy-chained to the base station by coupling the antennas to a single communication path to the base station. Varying time delay elements 621–623 are inserted at various locations on the communication path to accomplish the objectives of the present invention. Although the daisy chain configuration may be less costly than the star configuration, it is not as reliable because a break in any point in the communication path affects communications between the other antennas and the base station.

Figure 7A:
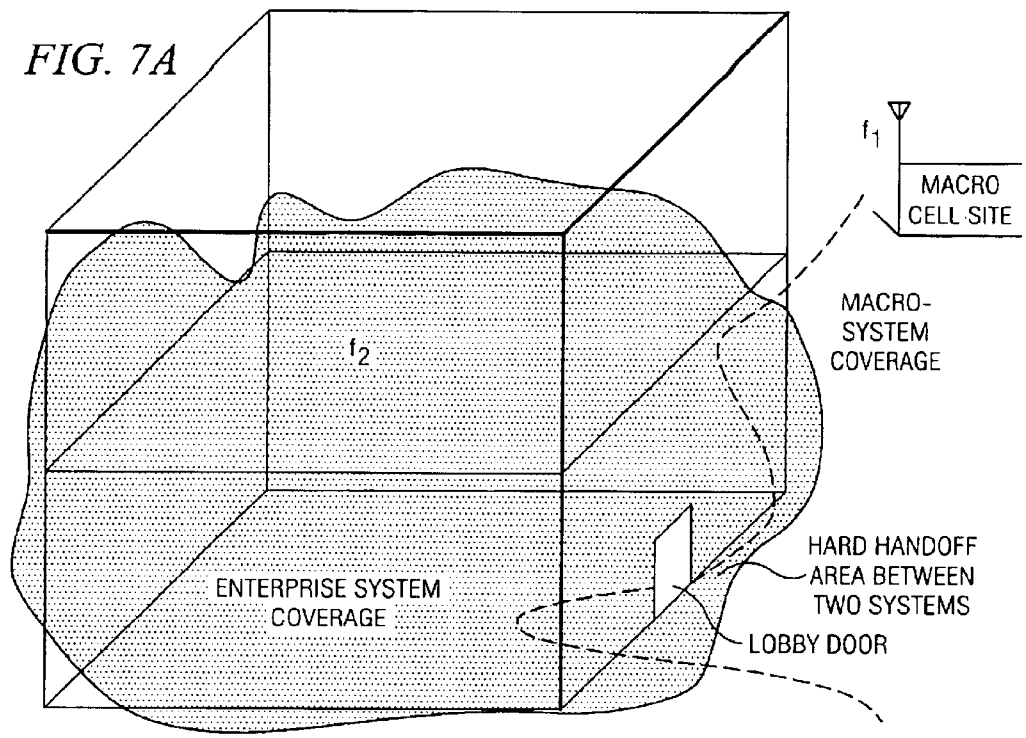
FIGS. 7A and 7B are block diagram illustrations of different configurations of the enterprise system of the present invention co-existing with the macro public system coverage.

FIG. 7A is a block diagram illustration of one embodiment of the present invention in co-existence with the macro public system. In the example illustrated in FIG. 7A, the two systems operate with different carrier frequencies and seamless services via hard handoff. In the example shown in FIG. 7A, handoffs between the enterprise system and mobile units within the enterprise system occur within region $f_2$ and handoffs between mobile units and the macro system occur at the lobby door.

Although the system shown in FIG. 7A can handle handoffs between the enterprise mobile system and the macro public system seamlessly, the coverage area as depicted by region $f_2$, is quite large and could contribute to some level of ping-ponging between the enterprise mobile units and the enterprise base station with the macro system.

Figure 7B:
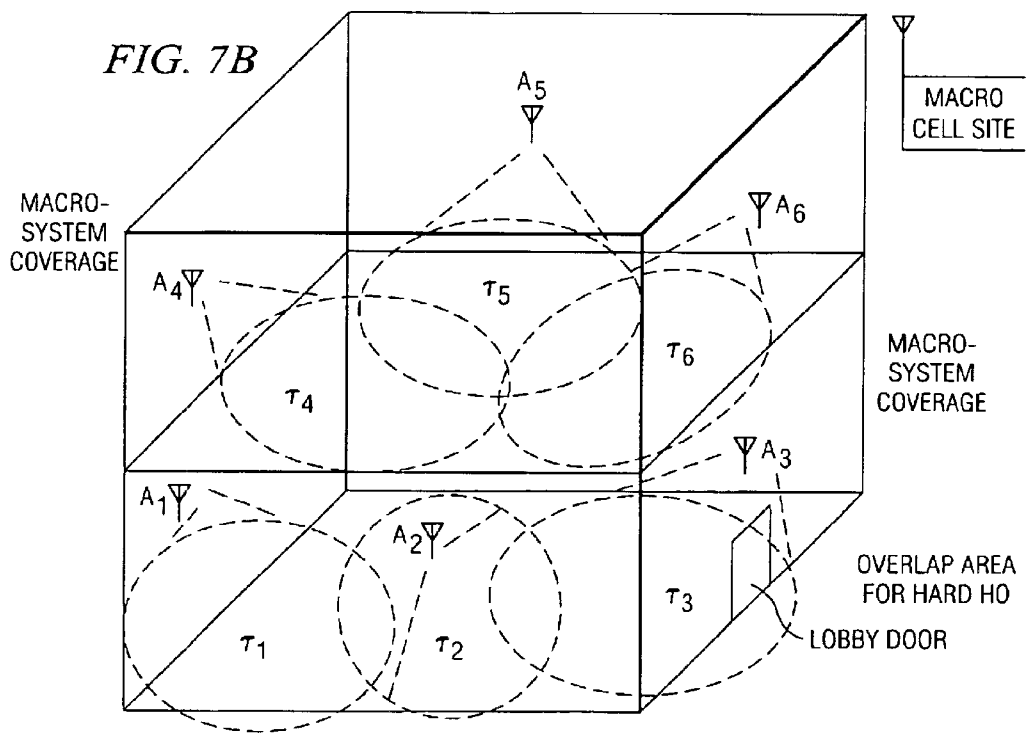

FIG. 7B is an exemplary illustration of the multiple distributed EAUs implementation of an embodiment of the present invention. In the example illustrated in FIG. 7B, each EAU (e.g. $A_1$ . . $A_n$) covers specific areas with the enterprise system. Each EAU has delay elements inserted in its communication path with the enterprise base station in order to allow the base station to identify the user location of a mobile unit requesting handoff to the public system. In the example illustrated in FIG. 7B, the handoff transition region is not as wide as that illustrated in FIG. 7A. Consequently, ping-ponging of handoff requests between the enterprise mobile units and the enterprise base station with the public system is substantially reduced.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention. Various embodiments with various modifications are suited to the particular use contemplated. It is intended that the scope of the invention be defined by the claims appended hereto and their equivalents.

What is claimed:

1. An enterprise optimized hand-off control wireless code division multiple access, CDMA, communication system, comprising:

- a local area network, LAN, having an ethernet communication back-bone;
- a plurality of CDMA wireless base stations coupled to said ethernet communication back-bone;
- a plurality of extended antenna units coupled to said CDMA wireless base stations;
- a communication path coupled to said ethernet communication back-bone;
- a signal distribution concentration unit coupled to said base stations;
- a delay circuit unit coupled to said antenna units, the delay circuit unit including a plurality of delay elements for delaying signals transmitted via the communication path to external wireless communication devices within the enterprise wireless communication system.

2. The system of claim 1, wherein said delay circuit unit comprises a signal transmit distribution subsystem unit coupled to distribute communication signals received by the delay circuit unit within the enterprise wireless communication system to said extended antenna units.

3. The system of claim 1, wherein said delay circuit unit further comprises a signal receive concentration subsystem coupled to receive communication signals generated by communication devices within the enterprise wireless communication system, said signal receive concentration subsystem transmitting said communication signals.

4. The system of claim 2, wherein said signal transmit distribution subsystem comprises a plurality of signal transmit delay elements coupled to a signal dividing unit.

5. The system of claim 3, wherein said signal receive concentration subsystem comprises a plurality of signal receive delay elements coupled to a signal combining unit.

6. The system of claim 1, wherein said CDMA wireless base stations include a user location determination logic for determining a location of a mobile communication user within the enterprise communication system.

7. The system of claim 4, wherein said delay circuit unit further comprises delay signal strength detection logic for determining which delayed signal received by the delay circuit unit must be transmitted to a receiving target mobile communication device within the enterprise communication system.

* * * * *